Jan. 21, 1947.  E. A. DOYLE  2,414,510
APPARATUS FOR CLADDING METAL BODIES
Filed May 2, 1941
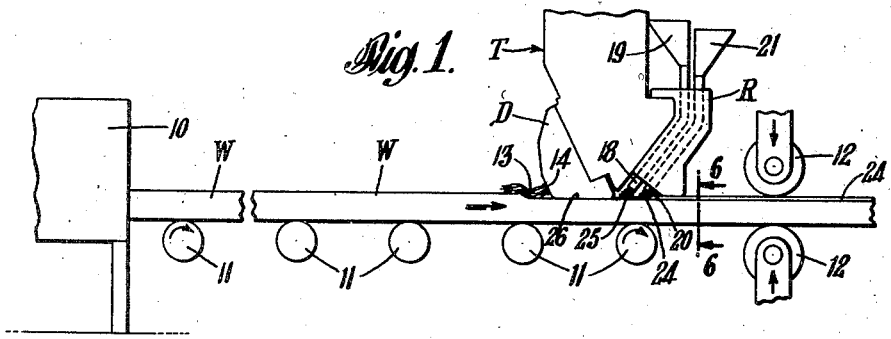
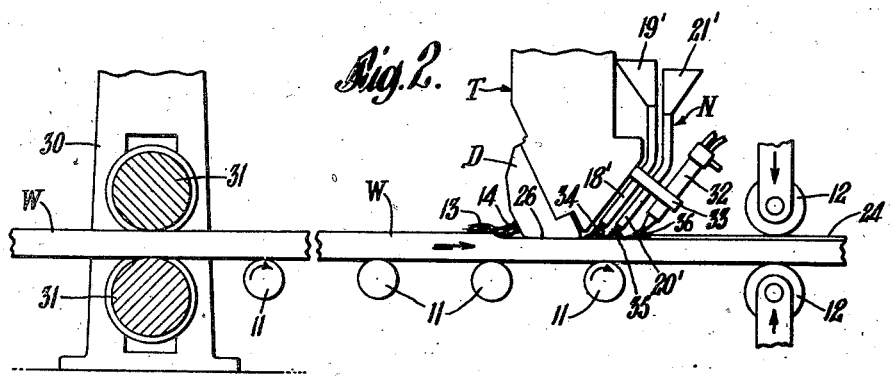
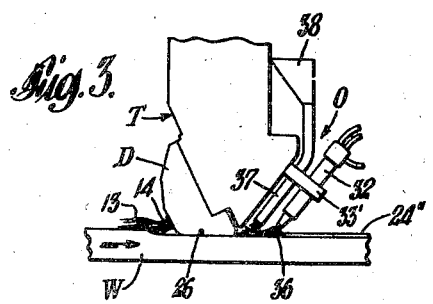
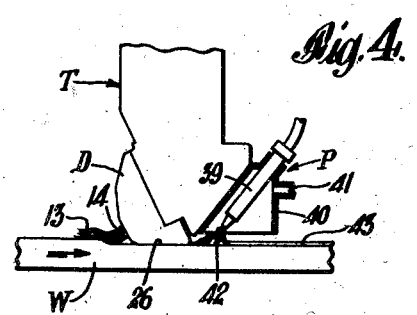
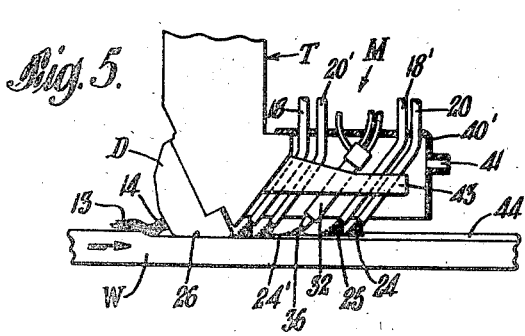
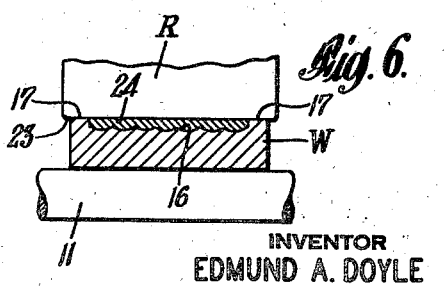
INVENTOR
EDMUND A. DOYLE
BY
ATTORNEY Patented Jan. 21, 1947

2,414,510

UNITED STATES PATENT OFFICE 2,414,510

APPARATUS FOR CLADDING METAL BODIES

Edmund A. Doyle, Brooklyn, N. Y., assignor to The Linde Air Products Company, a corporation of Ohio Application May 2, 1941, Serial No. 391,555

1 Claim. (Cl. 29—33)

This invention relates to the art of uniting different metals and more particularly to apparatus for cladding a body of corrodible metal, such as iron or steel, with a metal relatively more resistant to corrosion.

The main objects of this invention are to provide means for uniformly coating a member of one metal with another metal to obtain a composite body; means for insuring a positive bond between the coating metal and the base metal; an improved apparatus for uniting metals; and means for cladding so that subsequent mechanical machining operations to produce a smoothly finished surface are unnecessary.

Briefly, there is provided in accordance with one aspect of the invention, apparatus for uniting one metal, such as a ferrous metal body either initially cold or at a normal-rolling temperature, with another metal, such as a corrosive resistant coating, by first preheating the ferrous metal body, if cold; then cleaning and heating the entire surface to be clad by a thermochemical desurfacing operation which removes a layer of metal from said surface by the conjoint action of a stream of oxygen and a heating flame, which flame is produced by a burning mixture of oxygen and fuel gas, preferably acetylene; applying to the resulting new clean surface, while it is still hot due to the desurfacing operation and under the relatively inert atmosphere produced by the desurfacing operation, cladding metallic material in the form of a spray or molten liquid or powder, and compressing the composite body between pressure rolls to produce a smooth solid metallic coating which is well bonded to the base metal. An essential feature of the invention is the continuous production of a new clean, properly heated surface on the base metal by the thermochemical desurfacing operation, which operation is performed immediately prior to and correlated with the cladding or coating operation, so that said new surface receives the hot cladding or coating material while such surface is clean and hot and covered with a protective atmosphere which prevents oxidation of the surface by oxygen contained in the air.

Referring to the drawing:

Fig. 1 is a fragmentary view mainly in side elevation of apparatus for cladding ferrous metal members with molten non-ferrous metal;

Fig. 2 is a view similar to Fig. 1 of a modification for hot rolling and cladding ferrous metal slabs with ferrous or non-ferrous metal powder;

Fig. 3 is a view similar to Fig. 1 of another modification wherein a mixture of powdered flux and cladding material to form a desired alloy of cladding metal is applied to the desurfaced base metal member;

Fig. 4 is a fragmentary view similar to Fig. 1 wherein the desurfacing unit is provided with spray gun means for applying flux and coating metal to the travelling body immediately after it has been operated upon by the desurfacing unit;

Fig. 5 is a fragmentary view partially in side elevation and partially in section of a unit for desurfacing and resurfacing a ferrous metal slab by the application of a plurality of layers of cladding material in any desired combination, such as powdered and molten metal, the coated slab being reheated between the line of application of the powdered metal and the line of application of the molten metal; and Fig. 6 is a fragmentary view in cross section taken on line 6—6 of Fig. 1.

It is well known to those skilled in the art of welding metals, that surfaces to be joined must be free of foreign matter, such as the various forms of oxide and other particles. Furthermore, it is known that the metals to be joined must be raised to a temperature that will cause a positive bond to be formed therebetween.

Referring to Fig. 1 of the drawing, there is shown a furnace 10 for progressively preheating an elongated member W of base metal to be clad, such as a ferrous metal slab, which is initially cold or at a temperature slightly below that necessary for hot rolling, before the slab W is advanced over a work table comprising rolls 11 some of which are driven to advance the slab W in the direction indicated by the arrow. The slab is caused to move under a combined desurfacing and resurfacing unit T and finally between cooperating squeeze rolls 12, 12 which are adapted to compress the composite metal slab between them to complete the cladding operation.

The unit T preferably comprises a desurfacing head D substantially similar to that described in Patent No. 2,200,259 to Bucknam et al. dated May 14, 1940, which is capable of continuously and progressively desurfacing slabs through a wide range of widths. The parallel streams of oxygen and the parallel (both of which are shown at 13) preheating flames discharged by the nozzles 14 of the desurfacer D preferably are adjusted to take a light desurfacing cut or layer of metal off of the steel slab W, which cut is preferably in the nature of a wash of approximately 1/64 inch deep or less, forming shallow substantially parallel longitudinal grooves 16 and intervening substantially parallel ridges of a few thousandths of an inch in height, as shown by Fig. 6.

While the entire width of the slab W may be deseamed or desurfaced in a single pass by the desurfacer D, it is preferred, according to the present invention, to desurface, or remove a layer of metal from only a surface portion spaced from the opposite borders of the slab W so as to leave lateral strips or dams 17, 17 of undesurfaced base metal along the sides of the slab W, which are higher than the scarfed or grooved-and-ridged new heated surface portion of the slab therebetween. If desired, similar unscarfed portions or dams may be provided adjacent the ends as well as adjacent the sides of the slab W. This may be accomplished by starting the desurfacing operation a short distance beyond the end of each slab W and discontinuing such operation a short distance from the opposite end of the slab. If the starting and stopping of the desurfacing operation on each slab is carried out in this manner, the end dams are not as sharp as the lateral dams 17, but have a tapering shape which is preferably sheared or cut off as the material passes through the rolling process.

The unit T also comprises a resurfacer R provided with a row of nozzles 18 connected to a hopper 19 containing a suitable flux, and a row of nozzles 20 connected to a tank 21 containing the molten cladding material, such as a non-ferrous metal (for example: copper, brass, bronze, Monel metal, etc.). The resurfacer or cladding head R may be provided, for use with relatively soft metals at least, with a horizontal edge or screed 23 which is adapted to contact the lateral dams 17 on the top of the slab W and level the molten material 24 supplied to the desurfaced area of the slab W by the nozzles 20. The levelling device 23 is preferably omitted from the resurfacer R in the event that the deposited material is of such a nature that it is not satisfactorily levelled thereby, or for any other reason.

In the operation of the apparatus shown in Fig. 1, a ferrous metal slab W is brought up to a rolling temperature in the furnace 10 and is scarfed or skinned by the desurfacer D. The desurfacer D progressively applies a wide heating flame and a wide oxidizing stream obliquely against the top surface of the moving slab W and thereby thermochemically removes a very thin stratum of metal from such top surface, leaving a new clean surface substantially free from defects and oxides. This thermochemical metal removing operation also imparts intense heat to such new clean surface and produces a gaseous atmosphere which envelops said clean surface sufficiently to substantially exclude air therefrom and thereby effectively protects the clean surface and the cladding material from oxidation during the cladding operation. Immediately after the desurfacing operation and while the temperature of the desurfaced area is elevated as a result of such operation and while the clean hot desurfaced area is enveloped in air-excluding or protective gases, suitable flux in a molten or powdered state is applied to the desurfaced area by the nozzles 18, and the application of the flux 25 is immediately followed by the application of the molten cladding material 24 which fills the undercut space between the dams 17 and is levelled by the screed 23 when the latter is used. As pointed out above, the levelling device 23 may be entirely omitted if desired. Then, as soon as the molten metal 24 is sufficiently solidified on the slab W, the composite member is compressed between the pressure rolls 12, 12. The envelope of relatively inert protective gases produced by the desurfacing operation of the desurfacer D serves to prevent oxidation of the clean heated new surface 26 prior to the application of flux 25. This constitutes an important feature of the present invention because in thermochemical desurfacing as long as the desurfaced area remains under a protective atmosphere it is not oxidized and by applying the flux and coating metal to the thermochemical desurfaced area under the protective atmosphere, a very good bond is obtained between the coating metal and the base metal.

Referring to Fig. 2 of the drawing there is shown a conventional blooming roll stand 30 which is provided with rolls 31, 31 for reducing the thickness of the hot slab W in the usual manner as the slab is delivered to the roll table 11. In this modification the combined desurfacing and resurfacing unit comprises a substantially conventional desurfacer D and a resurfacer N composed of a row of flux nozzles 18' connected to a flux hopper 19', a row of powdered metal nozzles 20' connected to a hopper 21' and a row of heating blowpipes 32, connected together by a bracket 33. The pinch rolls 12, 12 in this modification are similar to those described above in connection with Fig. 1.

The flux applied to the scarfed surface 26 of the slab W by the nozzlezs 18' is preferably a volatile liquid flux 34, while the powdered metal 35 applied by the nozzles 20' is preferably a non-ferrous metal. The hopper 21' and nozzles 20' of the apparatus shown in Fig. 2 may be used for the application of a mixture of powdered metals to obtain any desired ferrous or non-ferrous alloy when melted, as pointed out below in connection with Fig. 3, although the apparatus of Fig. 2 is particularly suitable for the cladding of the hot ferrous metal slab W with a ferrous or non-ferrous metal alone.

The operation of the apparatus of Fig. 2 is somewhat similar to that described above in connection with Fig. 1, except that the hot slab is desurfaced as it leaves the blooming roll stand 30 and is immediately thereafter coated with liquid flux 34 from the nozzles 18' and with powdered metal from the nozzles 20'. The powdered metal is thereupon immediately heated by the oxy-fuel, preferably oxy-acetylene, gas flames 36 discharged by the blowpipes 32, which are as soft as practicable, and the composite member then passes through the squeeze or pinch rolls 12, 12 to complete the cladding operation. By cladding the hot slab W immediately after the blooming or slabbing stage, the cost of preheating is saved as well as the cost of handling the work. This is an important feature of the invention.

Referring to Fig. 3 of the drawing, there is shown a desurfacing and resurfacing unit comprising a desurfacer D and a resurfacer O which includes a row of nozzles 37 connected to a hopper 38 and a row of heating blowpipes 32, connected together by a bracket 33'. The hopper 38 is adapted to contain a mixture of powdered metals and a dry powdered flux. For example, to produce suitable mixture for a chromium-nickel-steel cladding for strip or plate, the following is a typical example selected from several specifications in the A. S. T. M. standards.

CHEMICAL INGREDIENTS

Grade 2—Type No. 302

| | Per cent |
|---|---|
| Carbon | 0.08 to 0.20 |
| Manganese, maximum | 1.50 |
| Sulfur, maximum | 0.030 |
| Phosphorus, maximum | 0.035 |
| Silicon, maximum | 0.75 |
| Chromium, minimum | 18.00 |
| Nickel, minimum | 8.00 |

All of the materials listed above are available in powdered form. These materials are preferably mixed with or without a suitable flux also in dry powdered form, and the mixture is placed in the hopper 38, so that the resulting coating 24" on the slab W is an alloy, in this case chromium-nickel-steel. The operation of the cladding apparatus shown in Fig. 3 is otherwise substantially similar to that described above in connection with Figs. 1 and 2.

Referring to Fig. 4 of the drawing there is shown a unit comprising a substantially conventional desurfacer D and a resurfacer P consisting of a row of metal spray guns 39 in a muffle 40 which is secured to the back of the desurfacer D and is provided with an inlet 41 connected to any suitable conventional means for supplying additional inert gas, if needed. If desired, the excess metal sprayed from the gun 39 may be reclaimed from the inside of the muffle 40 wherein it collects as a more or less solid material. However, for continuous operation, two muffles are preferably used, one being attached to the desurfacer D while the other is having the deposited metal removed therefrom.

In the operation of the apparatus of Fig. 4, the hot slab W is first desurfaced by the desurfacer D to provide the clean hot surface 26 to which thereafter metal, such as stainless steel, in the form of a spray 42 is applied by the guns 39 to provide a coating 43 on the slab W. The composite body is thereafter subjected to a rolling operation as described above in connection with Figs. 1 and 2.

Referring to Fig. 5 of the drawing, there is shown a unit comprising a substantially conventional desurfacer D and a resurfacer M consisting of a bracket 43 in which is mounted a row of flux nozzles 18, a row of powdered metal nozzles 20', a row of oxy-acetylene blowpipes 32, a row of flux nozzles 18', and a row of molten metal nozzles 20. These nozzles are enclosed within a muffle 40' having an inlet 41 connected to any conventional source of inert gas if desired. However, the blowpipes 32, in operation, normally maintain a reducing atmosphere within the muffle 40', in which case the outlet 41 is closed or entirely omitted.

In the operation of the apparatus shown in Fig. 5, the hot slab W is skinned or scarfed by the desurfacer D and while the skinned surface 26 is under the influences of the desurfacing operation, flux is applied thereto by the nozzles 18 immediately prior to the application of the powdered metal from the nozzles 20'. The resulting first coat 24' of cladding material is then reheated by the flames 36 from the oxy-acetylene blowpipes 32 and to the heated coating 24' is applied flux 25 from the nozzles 18', immediately following which molten metal 24 is flowed on the coating 24' from the nozzles 20, resulting in a composite layer of cladding metal 44 on the slab W. The coated slab is then passed through the squeeze rolls 12, 12 in the manner pointed out above in connection with Fig. 1. The muffle 40' serves to maintain the atmosphere inert under the resurfacer C in addition to preventing the loss of the sprayed metal in case spray guns are used to apply the cladding material to the slab W.

While the desurfacing and resurfacing units T of Figs. 1, 2, 3 and 4 are shown for applying but a single layer of coating or cladding material to the slab W, it will be understood that the resurfacers may be adapted to apply as many layers of cladding material as are necessary to build up the finished coating to a desired thickness, and any desired combination of the different ways of applying the various layers may be used, as suggested by Fig. 5. That is to say, the resurfacers of Figs. 1, 2, 3 and 4 may be used in any desired combination to build up the coating or cladding to the desired thickness. Also, any desired combination of different metals may be applied to produce the composite cladding or coating on the steel shape W.

If desired, flux may be applied in powdered form immediately after the desurfacing operation and prior to the deposition of the cladding material as pointed out above in connection with various figures of the drawing.

The mass composed of the base metal and the cladding material (regardless of whether applied as a powder or liquid or spray) is preferably passed through the pinch rolls 12, 12 for the purpose of making a more homogeneous bond between the two metals. If desired, however, the composite material is passed through a series of rolls in much the same manner as steel is rolled in a continuous rolling mill.

The present invention includes the use of a modified desurfacer D for the application of heat alone to work W that is to be clad, even though the benefits of a desurfacing operation are not taken advantage of, by the substitution of simple heating or welding blowpipe nozzles for the deseaming nozzles 14 which are adapted to remove surface metal from the slab W.

Also, if desired, a row of nozzles may be used behind the desurfacing nozzles 14 for applying liquid volatile flux to the surface 26, for supplying additional heat to the metal prior to receiving the cladding material or to help retain the heat put in the work W by the operation of the desurfacing nozzles 14, and for furnishing a greater surface of metal included in the inert gas zone produced by the oxy-acetylene flame envelope.

The resurfacer utilizing the metal spray process of depositing the cladding material to the desurfaced work is well adapted for the application of almost any metal. For example, it may be used to apply stainless steel to a slab of low carbon steel, as well as any of the non-ferrous metals, or, if desired, layers of several different metals may be applied to the work. The method of preparing the slab W, as pointed out above in connection with Figs. 1 and 6, may be applied as well to plate or any other shape of ferrous metal to prepare the same for cladding by any conventional cladding process, as by simply pouring molten ferrous or non-ferrous cladding material on the prepared surface of the member to be clad. According to the present invention, the desurfacing operation is used not only to prepare properly the surface of the slab or other shape for receiving the cladding material, but the desurfacing operation is used to form a peripheral dam around the desurfaced area to retain the cladding material until it is sufficiently solidified to be rolled with the slab or other shape.

In connection with that aspect of the invention disclosed above in connection with Figs. 2 and 3 wherein different metals in powdered form are premixed to produce a desired alloy of cladding material on a hot steel plate or slab, the latter may be suitably prepared for cladding by any conventional method, if desired. Also, the application of the mixed powder may be accomplished in several ways. For example, it may be applied to the base metal through a series of hoppers, the outlets of which are very narrow openings extending the full width of the material to be clad. The first hopper is disposed as near as possible to the desurfacing blowpipe nozzles and the powder is applied at the hottest point possible through the outlets of the hopper. This deposit may be immediately subjected to a row of oxy-fuel gas (preferably oxy-acetylene) flames, or to an oxy-fuel gas ribbon flame, (the flame to be as soft as practical). This row of flames may be immediately followed by a second hopper, adapted to make a deposit on top of the now melted powder originally fed to the base metal, the second hopper being followed by a second row of melting flames as just described. While only two hoppers and sets of melting flames are mentioned above, any number of these combinations may be used in order to obtain whatever thickness of deposit is required. After the powdered metal has been deposited and melted, the slab or plate is then passed through a set of rollers, as described above in connection with Figs. 1 and 2, for the purpose of obtaining a dense, smooth clad surface.

If a flux is necessary, either for the purpose of obtaining a better bond or for the purpose of causing gases to escape from the molten metal, such flux may be applied ahead of the powdered deposit or may be applied with it as desired.

The present invention is not confined to the application of powdered metal through hoppers or by melting the deposited powdered metal with oxy-fuel gas flames, because the powder alternately may be applied on a pre-prepared surface by any desired method of deposition and then passed through either a continuous or a stationary heating furnace for the required length of time to obtain the proper melting, in order to produce the desired solidity and smooth surface. An advantage of producing cladding of mixed metals by this method is that the mixture may be any desired combination (analysis).

Due to the difficulty of depositing metal in sufficient thicknesses for a single layer for certain classes of cladding, it is desirable to have several units operating one after another and separated only by additional heating flames for melting the deposited material and for producing inert atmosphere. If desired, the same type of depositing equipment may be used for each of the units, that is to say, if it is necessary to deposit a thicker layer than could be melted at the required speed when using powder, for example. Several rows of powder depositing hoppers may be provided with the necessary heating heads between them, or in the event of spraying metal, several batteries of spray guns may be used with the necessary heating heads disposed therebetween.

It will be appreciated that the invention takes advantage of the clean heated new surface of the base metal immediately after thermochemical desurfacing, and before the formation of oxide, and also utilizes the additional heat input of the thermochemical desurfacing operation, in uniting metals, and although the invention is particularly useful in the cladding of a ferrous metal base with another metal, it should be understood that the principles of the invention may be applied to continuous cladding in general where the metals to be united are of either different or similar composition and any additional material is employed.

To summarize, the member to be clad is heated to a temperature necessary for the desurfacing process. The member is then thermochemically desurfaced or deseamed with oxygen on one side or all over (Patent No. 2,210,921, Jones et al., dated August 13, 1940) leaving a hot and clean new surface. It is to be noted, however, that in thermochemically desurfacing a steel plate, a slightly rough or grooved-and-ridged finish, as compared to a rolled surface, is produced and this finish provides a very satisfactory surface for cladding, especially before such finish comes in contact with air, because the finish is substantially pure base metal free of oxides, as long as it is protected by the relatively inert gas resulting from the desurfacing operation. Immediately after, or in conjunction with the desurfacing process, while said finish is under the envelope of such relatively inert gas the cladding material is applied in any one of various forms and is more expeditiously and firmly united to the metal base or steel plate because of such grooved-and-ridged heated new surface thereon. In the case of the spray gun, the metal may be applied in a form which requires no additional heating. In the case of powdered metal, additional heat may be necessary to perfect the bond.

Advantages of the invention include: (1) the production of any desired shape of ferrous metal provided with a clad of predetermined thickness having a smooth outer surface; (2) the rapid unification of different metals to form a composite body; (3) great economy in cladding by virtue of desurfacing a ferrous metal body and subsequently resurfacing it with another metal in a continuous process.

While the invention has been disclosed in the cladding of only one face of the ferrous metal member W in a single pass, it will be understood that two or more or all of the faces of such member may be clad at the same time in a single pass in accordance with the invention, so that, if desired, the member W may be completely clad between rolling stages in an otherwise conventional rolling mill, in a convenient, rapid and economical manner.

What is claimed is:

Apparatus comprising, in combination, a conveyor adapted to move a metal member continuously in the direction of its length, a desurfacing and resurfacing unit disposed adjacent the path of said member, said unit comprising an oxygen desurfacer for thermochemically removing a layer of surface metal from said metal member with the aid of streams of oxygen which form parallel shallow grooves, fluxing means associated with said unit for continuously applying flux to said new surface while it is still hot, and a resurfacer comprising spray gun means for filling said grooves with cladding metal immediately after said flux is applied thereto by said fluxing means, and a muffle enclosing said spray gun means.

EDMUND A. DOYLE.